United States Patent [19]

Morita

[11] Patent Number: 4,864,352
[45] Date of Patent: Sep. 5, 1989

[54] IMAGE RECORDING APPARATUS AND SYSTEM
[75] Inventor: Naoyuki Morita, Kanagawa, Japan
[73] Assignee: Fuji Photo Film Co., Ltd., Kanagawa, Japan
[21] Appl. No.: 188,872
[22] Filed: May 2, 1988
[30] Foreign Application Priority Data

| May 1, 1987  | [JP] | Japan | 62-108546 |
| May 1, 1987  | [JP] | Japan | 62-108547 |
| Jun. 24, 1987 | [JP] | Japan | 62-157438 |
| Jul. 24, 1987 | [JP] | Japan | 62-185213 |
| Jul. 30, 1987 | [JP] | Japan | 62-191176 |

[51] Int. Cl.$^4$ .................................................. G03B 27/52
[52] U.S. Cl. ........................................... 355/27; 355/28; 250/318
[58] Field of Search ............... 355/27, 28, 35, 71, 355/32; 250/317.1–319

[56] References Cited

U.S. PATENT DOCUMENTS

| 4,772,922 | 9/1988  | Kawahara et al. | 355/32    |
| 4,780,736 | 10/1988 | Saito et al.    | 250/319 X |
| 4,783,683 | 11/1988 | Nagumo et al.   | 355/27    |
| 4,800,275 | 1/1989  | Shimizu et al.  | 355/27 X  |

Primary Examiner—L. T. Hix
Assistant Examiner—D. Rutledge
Attorney, Agent, or Firm—Sughrue, Mion, Zinn, Macpeak & Seas

[57] ABSTRACT

A thermal developing photo-sensitive material is conveyed from a supplying roll to a winding roll along a straight path. Linear optical exposure is provided to the photo-sensitive material. An image forming solvent is applied to the photo-sensitive material along this straight path. An image receiving material is combined with the photo-sensitive material, and the photo-sensitive material and the image receiving material are heated, also along this straight path, so that the image formed on the photo-sensitive material is transferred onto the image receiving material. The supplying roll and the winding roll are accommodated in a single magazine, and while the photo-sensitive material is being wound on the winding roll, the image receiving material is allowed to come off the photo-sensitive material automatically. No cutting apparatus for the photo-sensitive material is required.

23 Claims, 4 Drawing Sheets

IMAGE RECORDING APPARATUS AND SYSTEM

BACKGROUND OF THE INVENTION

This invention relates to a high-speed, high-efficiency image recording apparatus and system, for recording images o photo-sensitive material, and to an image recording roll magazine loaded in an image recording apparatus for recording a color image on photo-sensitive material.

When color images have been recorded by optically applying electrical image signals to a photo-sensitive material, a so-called "drum type image recording system" has been employed. In this image recording method, a drum on which a photo-sensitive material of a predetermined size has been wound is rotated, and the photo-sensitive material is scanned by a modulated point light source in a direction parallel to the drum.

However, since the speed of rotation of the drum has an upper limit, it is rather difficult to improve the image recording speed. Furthermore, it takes a relatively long time to attach the photo-sensitive material to the drum or to detach it from the drum, and the mechanism for doing so is relatively intricate. Thus, the image recording apparatus is necessarily bulky and complicated. In addition, the photo-sensitive materials are of a predetermined size and are processed batchwise one at a time, so that the number of photo-sensitive materials which could be processed per unit time is relatively small.

One example of the above-described image recording apparatus (Japanese Patent Application Laid-Open No. 279,973/87) now will be described with reference to FIGS. 4 and 5. As shown in FIG. 4, a thermal developing photo-sensitive material 16 is accommodated in a magazine 14 which is loaded in a housing 12. The photo-sensitive material 16 is pulled out of the magazine 14 and then is cut to a predetermined length by a cutter 18. The cut photo-sensitive material 16 is wound around an exposure drum 20 (in the direction of the arrow A). An exposure head 22 having three color point light sources made up of light emitting elements faces the exposure drum with the material 16 disposed therebetween. After one optical image exposure, the exposure drum 20 is turned in the opposite direction, so that the photo-sensitive material 16 comes off the drum by a scraper 24. The material then is conveyed through a water applying unit 26 to a developing and transferring unit 28.

Image receiving sheets 32 stacked on a tray 30 are delivered to the developing and transferring unit 28 one at a time. In the unit 28, each image receiving sheet 32 is combined with a corresponding piece of photo-sensitive material 16, and then the image receiving sheet 32 and the photo-sensitive material 16 are heated by a heater in the unit 28. Thus, the photo-sensitive material is developed, and the developed image is transferred onto the image receiving sheet 32. Thereafter the photo-sensitive material 16 and the image receiving sheet 32 are separated from each other by a scraper 36, and the photo-sensitive material 16 is delivered into a disposal tray 38, while the image receiving sheet 32 is conveyed through a drying unit 40 to a take-out tray 42.

As shown in FIG. 5, the photo-sensitive material 16 wound on the exposure drum 20 is rotated around the axis (in the direction of the arrow A), thus permitting the main scanning operation of the exposure head 22. The exposure head 22 has three primary color light-emitting elements 44, and is moved along a guide 46 arranged parallel to the axis of the exposure drum 20 to perform an auxiliary scanning operation in the direction of the arrow B. In order to move the exposure head 22 in the direction of the arrow B, a pair of pulleys 48 and 50 are arranged in a line which also is parallel to the axis of the exposure drum and a wire 52 is laid over the pulleys 48 and 50, with one end secured to one side of the exposure head 22 and with the other end secured through a tension means 54 to the other side of the exposure head 22.

The photo-sensitive material 16 cut to the predetermined length by the cutter 18 is wound on the exposure drum 20, and the drum 20 is rotated in the direction of the arrow A by an electric motor (not shown). As the pulley 48 is turned, the exposure head 22 is moved in the direction of the arrow B to carry out the auxiliary scanning operation. In the auxiliary scanning operation, the light emitting elements 44 perform exposure only when the pulley 48 is driven clockwise (in the direction of the arrow C).

After exposure, referring again to FIG. 4, the exposure drum 20 is turned in the opposite direction, and the photo-sensitive material 16 is removed from the exposure drum 20 by the scraper 24 and then is delivered through the water applying unit 26 to the developing and transferring unit 28. The image receiving sheet 32 taken out of the tray 30 is delivered to the developing and transferring unit 28, where it is combined with the photosensitive material 16 such that the emulsion surfaces of the image receiving sheet 32 and the photo-sensitive material 16 are kept in close contact with each other. Under this condition, the heater in the developing and transferring unit 28 is energized, as a result of which the latent image on the photo-sensitive material 16 is thermally developed, and the image thus developed is transferred onto the image receiving sheet 32. In this case, the image is positively transferred onto the image receiving sheet 32 because water has been applied to the emulsion surface of the thermal developing photo-sensitive material 16 by the water applying unit 26. After the image transferring operation, the photo-sensitive material 16 is removed from the image receiving sheet 32 by the scraper 36 and is then delivered into the disposal tray 38, while the image receiving sheet 32 is delivered into the take-out tray 42.

As described above, in an image recording apparatus using thermal developing photo-sensitive material, the photo-sensitive material 16 cut to a certain length is subjected to optical exposure and other treatments after being wound on the exposure drum 20. The operations of cutting the photo-sensitive material, of attaching the photo-sensitive material to the exposure drum, and of removing it from the exposure drum take a relatively long period of time, and require an intricate mechanism. Furthermore, in the image recording apparatus, an image is recorded on the photo-sensitive material 16 by the main and auxiliary scanning operations which are effected with the three light emitting elements 44 provided on the exposure head 22 to give exposure in three colors according to the photo-sensitivity characteristic of the photo-sensitive material 16, and therefore the image recording time is considerably long. In addition the image recording size is limited by the diameter of the exposure drum 20. Furthermore, since it is necessary to provide the scraper 36 for removing the image receiving sheet 32 from the photo-sensitive material 16, and the disposal tray 38 for receiving the photo-sensitive material 16 used, the apparatus is unavoidably bulky.

SUMMARY OF THE INVENTION

In view of the foregoing, a first object of this invention is to provide an image recording apparatus in which the conveyance path of the photo-sensitive material is made straight, no photo-sensitive material cutting mechanism is necessary, and after the developing operation the image receiving sheet automatically comes off the photo-sensitive material to miniaturize the apparatus, and in which a linear recording optical source is provided to reduce the image recording time.

The foregoing and other objects are achieved by an inventive image recording apparatus which comprises: photo-sensitive material supplying means for conveying a thermal developing photo-sensitive material wound on a supplying roll along a linear conveyance path and for winding the photo-sensitive material on a winding roll; exposure means for giving a linear optical exposure to the thermal developing photo-sensitive material in a direction perpendicular to the direction of conveyance of the photo-sensitive material in synchronization with the conveyance of the photo-sensitive material: solvent applying means, provided along the conveyance path, for applying an image forming solvent to the means; image receiving material supplying means for supplying an image receiving material of a predetermined size to the photo-sensitive material to which the image forming solvent has been applied by the solvent applying means, and placing the image receiving material on the photo-sensitive material; and thermal developing means for heating the photo-sensitive material and image material to subject the photo-sensitive material to thermal developing, such that, with the photo-sensitive material and image receiving material held, the thermal developing means achieves a thermal image transferring operation, wherein, after the thermal image transferring operation the photo-sensitive material is wound on the winding roll, causing the image receiving material to come off the photo-sensitive material.

According to another aspect of the present invention, there is provided an image recording apparatus which comprises: photo-sensitive material supplying means for conveying a thermal developing photo-sensitive material wound on a supplying roll along a linear conveyance path and winding the photo-sensitive material on a winding roll; exposure means for giving a linear optical exposure to the thermal developing photo-sensitive material in a direction perpendicular to the direction of conveyance of the photo-sensitive material; solving applying means, provided along the conveyance path, for applying an image forming solvent to exposure means; image receiving material supplying means for supplying an image receiving material of a predetermined size to the photo-sensitive material to which the image forming solvent has been applied to the solvent applying means; and thermal developing means for heating the photo-sensitive material and the image receiving material while the image receiving material is combined with the photo-sensitive material, to subject the photo-sensitive material to thermal developing, such that, after a thermal image transferring operation has been performed by the thermal developing means, the photo-sensitive material is wound on the winding roll, thereby causing the image receiving material to come off the photo-sensitive material.

In the image recording apparatus of the invention, the photo-sensitive material is conveyed in a straight line, the image recording operation is carried out while the photo-sensitive material is being wound on the winding roll and in the image recording operation the photo-sensitive material is not cut. Furthermore, in the apparatus, the exposure means gives a linear optical exposure to the photo-sensitive material in a direction perpendicular to the direction of conveyance of the photo-sensitive material with light beams of different wavelengths, so that image recording operations are successively achieved at high speed. Because the photo-sensitive material is not cut, it is unnecessary to provide a scraper for removing the image receiving sheet from the photo-sensitive material and to use the disposal tray for receiving the photo-sensitive material used. Thus, the apparatus can be made smaller.

A second object of the invention is to provide an image recording apparatus in which the photo-sensitive material is conveyed along a straight conveyance path, and after an image transferring operation has been achieved with the image receiving material combined with the photo-sensitive material, these materials are allowed to separate from each other automatically, for miniaturization of the apparatus, and for economical use of photo-sensitive material.

The second object of the invention has been achieved by the provision of an image recording apparatus in which an image recorded on a photo-sensitive material is transferred onto an image receiving material to provide a visible image. This apparatus comprises: photo-sensitive material supplying means for conveying the photo-sensitive material wound on a supplying roll along a linear conveyance path and winding the photo-sensitive material thus conveyed on a winding roll; and heating means provided along the conveyance path for heating the photo-sensitive material and the image receiving material, the heating means having a heating position and a standby position with respect to the conveyance path so that, when the heating means is held at the heating position, the heating means holds and heats the photo-sensitive material and the image receiving material.

In the image recording apparatus, the conveyance path of the photo-sensitive material is straight, and the image recording operation is carried out while the photo-sensitive material wound on the supplying roll is being wound on the winding roll; that is, in the image recording operation the photo-sensitive material is not cut, and the image is obtained by heating the photo-sensitive material. Furthermore, in the image recording apparatus, the standby position in which no heating is carried out enables starting and stopping of heating of the image-recorded region of the photo-sensitive material being wound on the winding roll, so that the remaining region which has been not used yet is prevented from being heated.

A third object of the invention is to provide an image recording system in which the photo-sensitive material can be handled with ease, and more specifically to provide an image recording system in which the conveyance path of the photo-sensitive material is made straight, the photo-sensitive material cutting mechanism is omitted, and the image receiving sheet and the photo-sensitive material are allowed to automatically separate from each other after the image transferring operation has been achieved with the image receiving sheet combined with the photo-sensitive material, for miniaturization of the image recording apparatus.

The third object of the invention has been achieved by an image recording system which, according to another aspect of the invention, includes a magazine comprising: a first chamber which accommodates a supplying roll on which a photo-sensitive material has been wound such that the supplying roll is rotatably supported therein, and has a light-shielded outlet through which the photo-sensitive material is pulled out of the first chamber; and a second chamber which accommodates a winding roll on which the photo-sensitive material, pulled out of the first chamber, is wound such that the winding roll is rotatably supported therein, and has a curved guide member for smoothly guiding the photo-sensitive material into the second chamber, and in which the photo-sensitive material pulled out of the first chamber is subjected to optical exposure while being wound on the winding roll in the second chamber, to form an image thereon, and the image thus formed is transferred onto a separately supplied image receiving material for recording.

In the image recording system, the photo-sensitive material supplying means and the photo-sensitive material winding means are provided in different respective chambers of the magazine, so that the photo-sensitive material can be handled with ease. The image recording operation is carried out while the photo-sensitive material wound on the supplying roll is being wound on the winding roll; thus, in the image recording operation, the photo-sensitive material is not cut at all. Furthermore, in the apparatus, image recording operations can be successively achieved at high speed by the provision of an exposure means which gives a linear optical exposure to the photo-sensitive material in a direction perpendicular to the direction of conveyance of the photo-sensitive material with light beams of different wavelengths.

A fourth object of the invention is to provide an image recording roll magazine which makes it possible to handle a photo-sensitive material such as a thermal developing photo-sensitive material which is used to record an image by transferring and more particularly to provide an image recording roll magazine suitable for an image recording apparatus in which the conveyance path of the photo-sensitive material is made straight, the photo-sensitive material cutting mechanism is omitted, and the image receiving sheet automatically comes off the photo-sensitive material after the image forming operation, enabling miniaturization of the apparatus, and in which a linear recording light source is arranged to reduce the image recording time.

The fourth object of the invention has been achieved by an image recording roll magazine which, according to the invention, comprises: a supplying roll on which a photo-sensitive material is wound; a first chamber which accommodates the supplying toll to support the supplying roll rotatably, the first chamber having a light-shielded outlet through which the photo-sensitive material is withdrawn straight from the first chamber; a winding roll on which the withdrawn photo-sensitive material is wound; and a second chamber which accommodates the winding roll to support the winding roll rotatably therein, the second chamber having a curved guide member for smoothly guiding the photo-sensitive material into the second chamber, the second chamber being integral with the first chamber.

The photo-sensitive material supplying means and the photo-sensitive material winding means both are provided the same magazine, so that the photo-sensitive material can be handled with ease. In an image recording apparatus using the inventive image recording roll magazine, the photo-sensitive material is conveyed along a straight conveyance path, and the image recording operation is achieved while the photo-sensitive material wound on the supplying roll is being wound on the winding roll; that is, in the image recording operation, the photo-sensitive material is not cut at all. Furthermore, in the apparatus, an exposure means for giving a linear optical exposure to the photo-sensitive material in a direction perpendicular to the direction of conveyance of the photo-sensitive material is provided to successively achieve image recording operations at high speed.

In the invention, the photo-sensitive material is of the type in which a latent image formed thereon by optical exposure is transferred onto the image receiving material to obtain a visible image. Examples of the photo-sensitive material and those of the image receiving material are thermal developing photo-sensitive materials (thermal developing photo-sensitive elements) and image receiving materials (pigment fixing elements), respectively, which are disclosed in U.S. Patent Nos. 4,430,415, 4,483,914, 4,500,626 and 4,503,136, Japanese Unexamined Published Patent Application Nos. 154445/1984, 165054/1984, 180548/1984, 218443/1984, 120356/1985, 88256/1986 and 238056/1986 (the term "OPI" as used herein means an "unexamined published application"), and Japanese Patent Application Nos. 169585/1985 and 244873/1985.

As used herein, the term "image forming solvent " is intended to mean the solvent which is required for formation of images. Examples of the image forming solvent are water, low boiling-point organic solvents (such as alcohol, ketone and amide), or solutions prepared by adding to those solvents various additives such as surface active agents, developing accelerating agents and developing stopping agents.

BRIEF DESCRIPTION OF THE DRAWINGS

The nature, principle and utility of the invention will become more apparent from the following detailed description when read in conjunction with the accompanying drawings, in which.

DETAILED DESCRIPTION OF THE PREFERRED EMBODIMENTS

Figure 1:
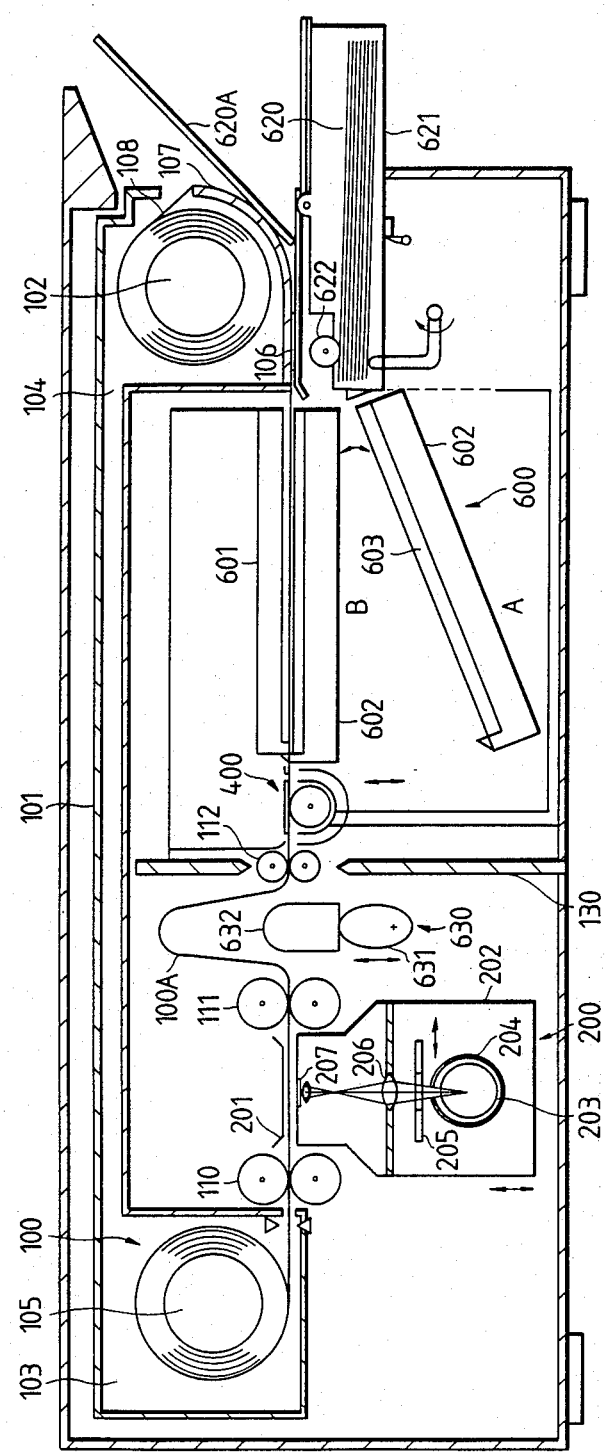
FIG. 1 is an explanatory diagram showing a first example of a image recording apparatus according to this invention.
Figure 4:
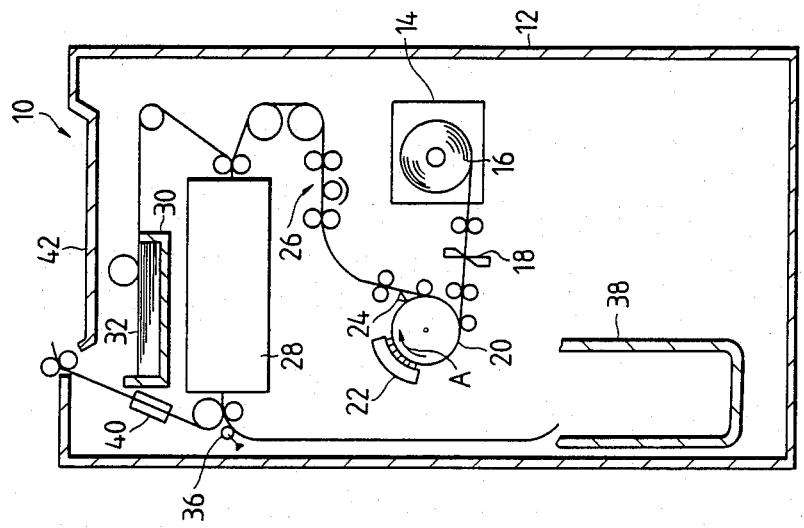
FIG. 4 is an explanatory diagram showing one example of a known image recording apparatus using a thermal developing photo-sensitive material.

A first example of an image recording apparatus according to the invention will be described with reference to FIG. 1. As shown in FIG. 1, a thermal developing photo-sensitive material 100 wound on a supplying roll 105 is loaded in one chamber 103 of a magazine 101. The photo-sensitive material 100 is pulled out of the chamber 103, conveyed to another chamber 104, and wound on a winding roll 102 in the chamber 104. An optical exposure unit 200, a photo-sensitive material slackening unit 630, a water applying unit 400, and a developing and transferring unit 600 are arranged in that order along a photo-sensitive material conveyance path along which the photo-sensitive material 100 is conveyed substantially horizontally. The external appearance of the magazine 101 is shown in FIG. 6.

Figure 6:
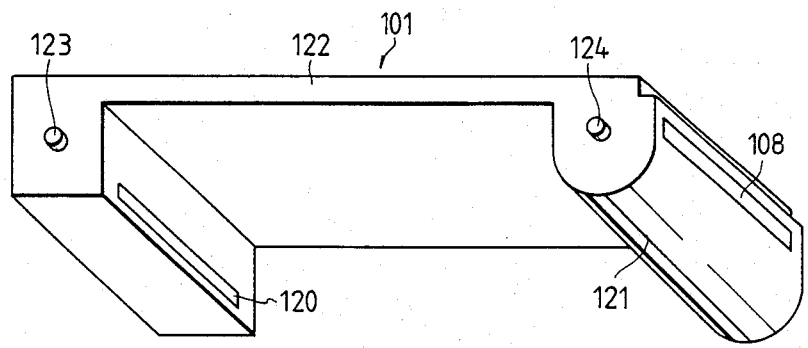
FIG. 6 is a perspective view showing one example of an image recording roll magazine employed in the image recording apparatus of the invention.

Referring again to FIG. 1 as well as to FIG. 6, the thermal developing photo-sensitive material 100 is pulled out of the chamber 103 through a slit-shaped photo-sensitive material supplying outlet 120, and led along the bottom of a guide 107 of the chamber 104 to a slit-shaped photo-sensitive material receiving inlet 108. In the chambers 103 and 104, the supplying roll 105 and the winding roll 102 are rotatably supported by drive shafts 123 and 124, respectively. When the magazine 101 is loaded in place in the image recording apparatus, the drive shafts 123 and 124 are coupled to a drive mechanism (not shown) which drives them.

Also in the photo-sensitive material conveyance path, pairs of conveying rollers 110, 111 and 112 are provided to smoothly and accurately convey the photo-sensitive material 100. A light shielding mechanism 106 is provided at the end of the photo-sensitive material conveyance path for shielding external light. The curved guide member 107 forms a part of the outer wall of the chamber 104 of the magazine 101 so that the photo-sensitive material developed is smoothly led into the chamber 104 through the inlet 108 and wound on the winding roll 102.

The optical exposure unit 200 is disposed between the conveying rolls 110 and 111. A photo-sensitive material setting board 201 is provided above the photo-sensitive material conveyance path at the optical exposure unit, to guide and position the photo-sensitive material 100. An optical exposure unit body 202 disposed below the photo-sensitive material conveyance path can be moved vertically as a unit by a mechanism (not shown). A linear white light source 203, such as a fluorescent lamp, is provided inside the optical exposure unit body 202. A mirror 204 is provided behind the light source 203. A filter board 205 is provided above the light source 203 such that it is movable horizontally (right and left). Three stripe-shaped filters different in color (e.g. cyan (C), magenta (M), and yellow (Y)) are provided on the filter board 205 such that they are automatically selected according to the optical exposure of the thermal developing photo-sensitive material 100. An optical lens 206 for forming an image on the photo-sensitive material 100 is provided above the filter board 205. A liquid crystal shutter array 207 which controls the transmission of light by the on-off operation of picture elements arranged in a column is disposed between the optical lens 206 and the photo-sensitive material conveyance path. Examples of the optical lens are an ordinary lens (such as a cylindrical lens), a micro lens array, or a SELFOC lens array.

The photo-sensitive material slackening unit 630 is provided between the conveying rollers 111 and 112. When necessary, a slackening member 632 is moved vertically by rotation of an eccentric cam 631 to slacken the photo-sensitive member 100 on the conveyance path as indicated at 100A in FIG. 1. This operation adjusts the difference between the exposure speed (for instance several millimeters per second) of the optical exposure unit 200 and the water applying speed (for instance several tens of millimeters per second) of the water applying unit 400. The vertically-movable water applying unit 400 is positioned between the conveying rollers 112 and the developing and transferring unit 600.

In the developing and transferring unit 600, a developing retaining board 601 for stably achieving a thermal developing operation is provided above the conveyance path, and a developing board 620 which is swingable between a position A (or standby position) and a position B (or developing position) is provided below the conveyance path. A planar heater 603 for heating the photo-sensitive material to a predetermined temperature is provided on the upper surface of the developing board.

A cassette 621 holding a number of image receiving sheets 620 of predetermined size is loaded below the chamber 104 accommodating the winding roll 102. The image receiving sheets 620 are delivered onto the developing board 602 at the position A (standby position) one after another by means of a sheet supplying roller 622. Light shielding and heat insulating members 130 are provided above and below the conveying rollers 112 so that the photo-sensitive material is stably subjected to optical exposure and to thermal developing.

In the image recording apparatus thus organized, in the standby state, the front end of the thermal developing photo-sensitive material 100 is located at the exposure unit 200, and the developing board 602 is at the position A. In addition, the exposure unit 200 and the water applying unit 400 are located at the lower positions, respectively, and the photo-sensitive material 100 is not slackened yet. Under this condition, when an image recording instruction is issued by a control means, the supplying roll 105, the winding roll 102 and the conveying rollers 110, 111 and 112 are driven to convey the photo-sensitive material 100, while the exposure unit 200 and the water applying unit 400 are lifted, and the filter position of the filter board 205 and the on-off operation of the picture elements of the liquid crystal shutter array 207 are controlled.

Figure 2:
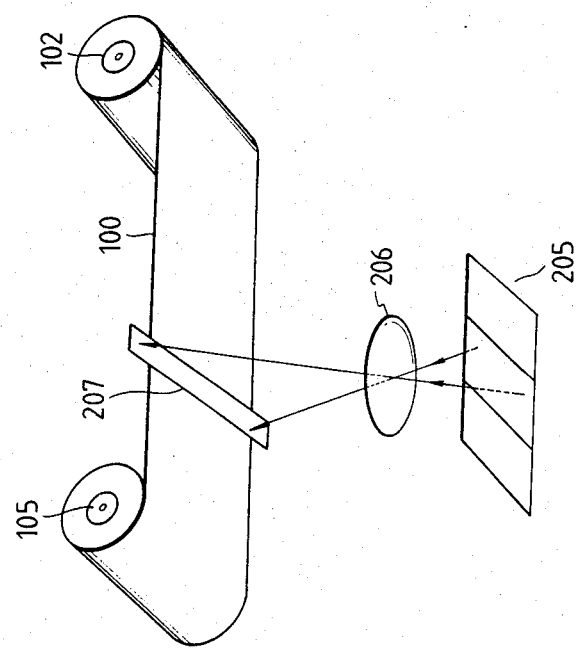
FIG. 2 is an explanatory diagram showing one example of an image-forming optical system in the image recording apparatus.

A linear exposure operation is carried out in a line scanning manner; that is, as shown in FIG. 2, the three different color filters of the filter board 205 are selected one after another so that the light passed through each of the filters is applied through the optical lens 206 to the elongated liquid crystal shutter array 207. In this operation, the on-off control of the picture elements of the liquid crystal shutter array 207 by an image signal allows the light to pass through the liquid crystal shutter array 207 thereby to expose the photo-sensitive material 100. The three different color filters of the filter board 205 are selected one after another for every line of the image, and al the lines of the image are recorded successively in this manner, so that the image is recorded in its entirety. In association with this optical exposure, the photo-sensitive material slackening unit 630 slackens the photo-sensitive material as indicated at 100A in FIG. 1.

Thereafter, water is applied to the photo-sensitive material 100 at a relatively high speed by the water applying unit 400. The photo-sensitive material 100 thus treated is delivered to the developing and transferring unit 600. In this operation, even if the water applying speed is different from the exposure speed the photo-sensitive material 100 will never be damaged, because the photo-sensitive material 100 is slackened as indicated at 100A in FIG. 1. On the other hand, one image receiving sheet 620 is delivered onto the developing board 602 at the position A from the cassette 621, and the heater 603 is energized.

Under this condition, the developing board 602 is swung to the position B. As a result, the image receiving sheet 620 is contacted to the photo-sensitive material which has been exposed and water-coated, and then is heated by the heater 603 to the predetermined temperature, so that the image is transferred onto the image receiving sheet. Thereafter, the developing board 602 is swung back to the position A, and the exposure unit 200 and the water applying unit 400 are returned to the lower positions. At the same time, the photo-sensitive material 100 is conveyed so as to be wound on the winding roll 102, and therefore the image receiving sheet 620A, to which the image has been transferred, is also conveyed together with the photo-sensitive material. In this operation, since the photo-sensitive material 100 is conveyed along the curved guide member 107, and the image receiving sheet 620A is relatively stiff, the latter 620A automatically comes off the photo-sensitive material 100 and drops by its own weight.

Thereafter, the photo-sensitive material 100 which has reached the inside of the light shielding mechanism 106 and has not been exposed yet is returned to the exposure unit 200; in other words, the portion of the photo-sensitive material which is not yet to be used for an image recording operation is returned to the exposure unit 200 before being subjected to thermal developing. Thus, the photo-sensitive material 100 can be economically used.

Figure 3:
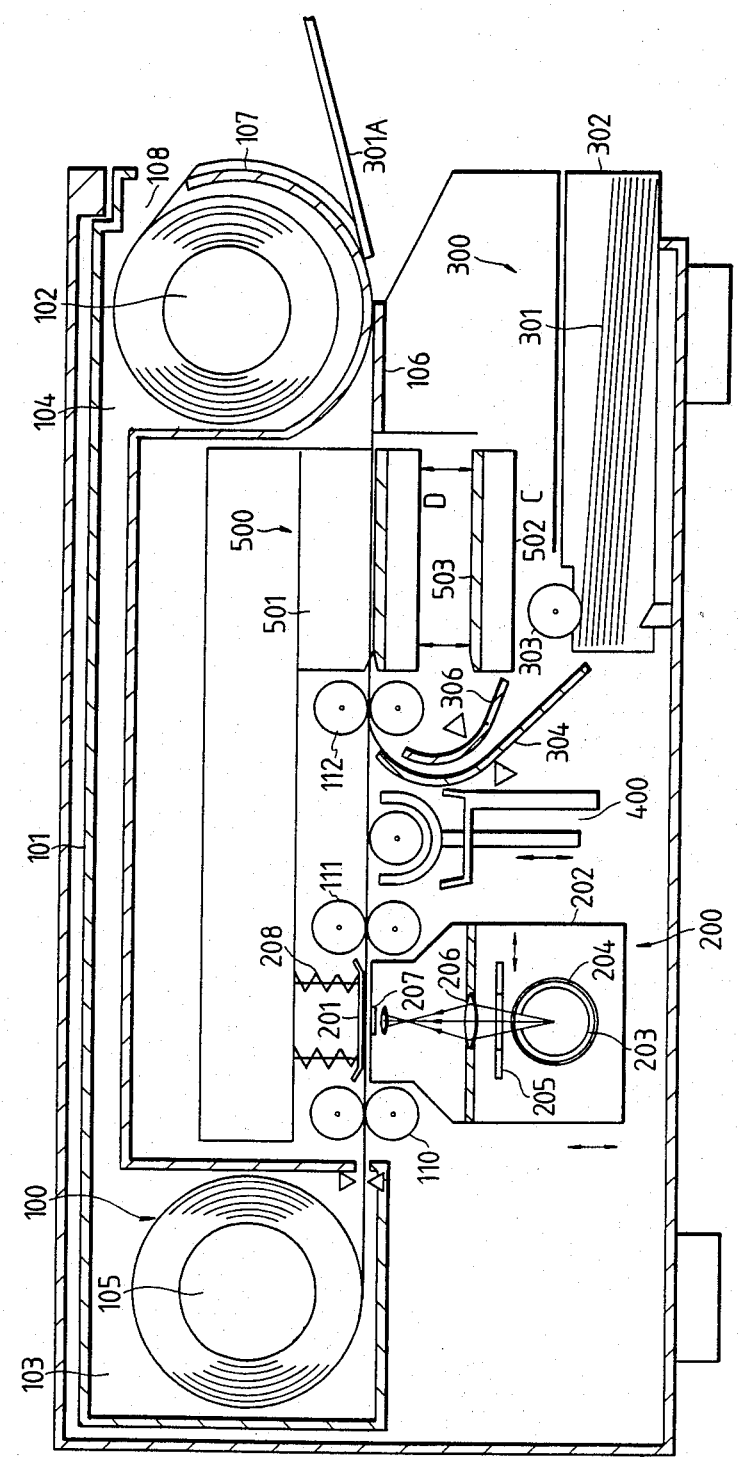
FIG. 3 is an explanatory diagram showing a second example of the image recording apparatus according to the invention.
Figure 5:
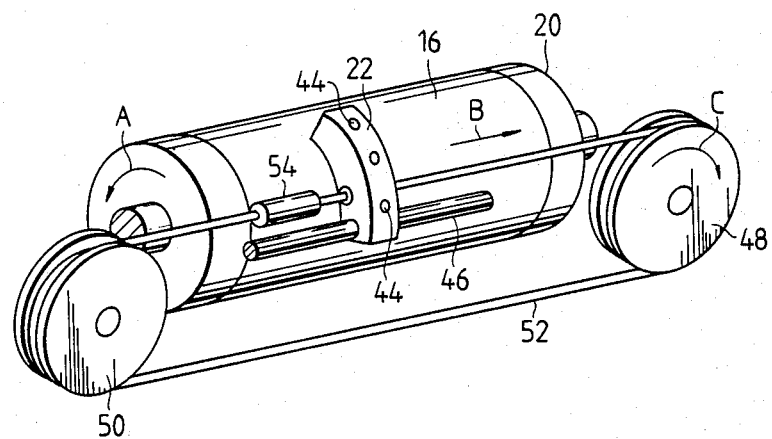
FIG. 5 is a perspective view showing an optical exposure unit in the know image recording apparatus.

A second example of the image recording apparatus according to the invention will be described with reference to FIG. 3. in which parts corresponding functionally to those which have been described with reference to FIG. 1 are designated by the same reference numerals or characters. The second example is different from the above-described first example in that it has no photo-sensitive material slackening unit (630) and has a developing and transferring unit 500 which performs a thermal developing operation continuously.

In the developing and transferring unit 500, a developing retaining board 501 for stably achieving a thermal developing operation is provided above the photo-sensitive material conveyance path, and a developing board 503 is provided below the photo-sensitive material conveyance path. The developing board 503 is swung between a position C (or standby position) and a position D (or developing position). A planar heater 503 for heating the photo-sensitive material to a predetermined temperature is provided on the upper surface of the developing board 502. When the image recording apparatus is in the standby state, the developing board 502 is heated at the position C, and when the thermal developing operation is carried out, the developing board 502 is held at the position D. The developing retaining board 501 may be designed to be vertically movable, to eliminate the thermal effect on the following recording frame. Developing efficiency can be improved by providing a developing heater for the developing retaining board 501.

A cassette 302 holding a number of image receiving sheets 301 of predetermined size is loaded below the developing and transferring unit 500. The image receiving sheets 301 are taken out of the cassette 302 one after another by means of a sheet supplying roller 303. Each sheet 301 thus taken out is delivered through a pair of curved guide members 304 and 305 to the conveying rollers 112, and is conveyed by the conveying rollers 112 while being combined with the photo-sensitive material 100. The guide members 304 and 305 are made of light-shielding and heat-insulating material, thus permitting stable optical exposure and thermal developing operation.

In the image recording apparatus thus organized, in the standby state, the front end of the thermal developing photo-sensitive material 100 is located at the exposure unit 200, and the developing board 502 is at the position C, When an image recording instruction is issued by a control means, the supplying roll 105, the winding roll 102, and the conveying rollers 110, 111 and 112 are driven to convey the photo-sensitive material 100, while the exposure unit 200 and the water applying unit 400 are lifted, and the filter position of the filter board 205 and the on-off operation of the picture elements of the liquid crystal shutter array 207 are controlled.

A linear exposure operation is carried out in a line scanning manner similarly as in the above-described image recording apparatus; that is, as shown in FIG. 2, the three different color filers of the filter board 205 are selected one after another so that the light passed through each of the filters is applied through the optical lens 206 to the elongated liquid crystal shutter array 207. In this operation, the on-off control of the picture elements of the liquid crystal shutter array 207 by an image signal allows the light to pass through the liquid crystal shutter array 207 thereby to expose the photo-sensitive material 100. The three different color filters of the filter board 205 are selected one after another for every line of the image, and all the lines of the image are recorded successively in this manner so that the image is recorded in its entirety.

Thereafter, water is applied to the photo-sensitive material 100 by the water applying unit 400. The photo-sensitive material 100 thus treated is delivered to the developing and transferring unit 500. In this case, the exposure speed of the exposure unit 200 is equal to the water applying speed of the water applying unit 400 (for instance about 2 mm/sec). The photo-sensitive material 100 is subjected to thermal developing at this speed. On the other hand the developing board 502 is held at the position D with the heater 503 at the predetermined temperature. At the same time, one image receiving sheet 301 is taken out of the cassette 302 by means of the sheet supplying roller 303. The image receiving sheet 301 thus taken out is delivered through the guide members 304 and 305 to the conveying rollers 112 so that it is combined with the photo-sensitive material 100 and passed over the developing board 502 at the position D together with the photo-sensitive material 100. As a result, the image is transferred from the exposed and water-treated photo-sensitive material 100 onto the image receiving sheet 120 which has been heated to the predetermined temperature by the heater 503.

Thereafter, the photo-sensitive material 100 is conveyed to be wound on the winding roll 102, and therefore the image receiving sheet 301A, onto which the image has been transferred, is also conveyed together with the photo-sensitive material. In this operation, since the photo-sensitive material 100 is conveyed along the curved guide member 107, and the image receiving sheet 301A is relatively stiff, the latter 301A comes off the photo-sensitive material 100 automatically, thus dropping by its own weight.

Thereafter, the photo-sensitive material 100 which has reached the inside of the light shielding mechanism 106 but has not been exposed yet is returned to the exposure unit 200. In addition, the developing board 502 is returned to the position C from the position D, and the exposure unit 200 and the water applying unit 400 are moved to the lower positions.

In the above-described examples of the image recording apparatus according to the invention, the three different color light beams are obtained for an image to be recorded by using the white light, the liquid crystal shutter array and the filter board; however, a thermomagnetic shutter array may be employed or a light emitting element array such as a light emitting diode array or laser diode array may be used. Furthermore, when the three different color light beams are output with filters, cylindrical filters may be employed. Instead of the linear light source, a light beam such as a laser beam may be employed, in which case exposure is achieved by scanning the photo-sensitive material with the light beam.

In the above-described image recording apparatus, the photo-sensitive material conveyance path is substantially straight, and it is unnecessary to use cutting means such as a cutter or a scraper. Therefore, the apparatus can be made correspondingly smaller. Furthermore, in the exposure unit, the exposure is performed in a linear direction that is perpendicular to the direction of conveyance of the thermal developing photo-sensitive material, so that the recording time can be reduced. In addition, the image recording apparatus of the invention has a simple construction and correspondingly can be manufactured at a low cost. Furthermore, the number of mechanical movable components is relatively small, so that the structure is durable, and its operation stable.

In addition, in the image recording apparatus of the invention, the photo-sensitive material and the image receiving material are heated only during the heating operation, and therefore, the heating process can be achieved with high accuracy.

As has been described above, in the image recording apparatus and image recording roll magazine of the invention, the photo-sensitive material wound on the photo-sensitive material supplying roll in the first chamber of the magazine is conveyed to the second chamber and wound on the photo-sensitive material winding roll therein, and therefore it is unnecessary to provide a disposal tray or the like. Since the photo-sensitive material supplying roll and the photo-sensitive material winding roll are provided in the first and second chambers of the magazine, respectively, the magazine can be readily loaded in and unloaded from the image recording apparatus, and the photo-sensitive material can be handled with ease.

While the invention has been described with respect to specific embodiments, various modifications within the spirit of the invention will be apparent to ordinarily skilled artisans. Thus, the scope of the invention should be considered as limited only in accordance with the appended claims which follow immediately.

What is claimed is:

1. An image recording apparatus comprising:
    photo-sensitive material supplying means for conveying a thermal developing photo-sensitive material wound on a supplying roll along a linear conveyance path and winding said photo-sensitive material on a winding roll;
    exposure means for giving a linear optical exposure to said photo-sensitive material along a direction perpendicular to said conveyance path and in synchronization with conveyance of said photo-sensitive material along said conveyance path;
    solvent applying means, provided along said conveyance path, for applying an image forming solvent to said photo-sensitive material after exposure by said exposure means;
    image receiving material supplying means for supplying an image receiving material of a predetermined size to said photo-sensitive material after said image forming solvent has been applied by said solvent applying means, and for combining said image receiving material with said photo-sensitive material; and
    thermal developing means for heating the combined photo-sensitive material and image receiving material to subject said photo-sensitive material to thermal developing, to perform a thermal image transfer operation;
    wherein winding of said photo-sensitive material on said winding roll after said thermal image transferring operation causes said image receiving material to come off said photo-sensitive material.

2. An apparatus as claimed in claim 1 wherein said exposure means comprises:
    a linear light source;
    filter means for applying light in three color wavelength corresponding to primary color spectral sensitivities of said thermal developing photo-sensitive material;
    a liquid crystal shutter array for controlling application of light from said linear light source to said photo-sensitive material; and
    an optical system for focusing the light from said linear light source on said photo-sensitive material.

3. An apparatus as claimed in claim 2, wherein said filter means comprises three stripe-shaped filters which are selectively applied to said optical system, to apply said light in said three color wavelengths.

4. An apparatus as claimed in claim 1, wherein said exposure means comprises:
    three light emitting element arrays for applying light in three color wavelengths corresponding to primary color spectral sensitivities of said thermal developing photo-sensitive material; and
    an optical system for focusing light from each of said light emitting element arrays on said photo-sensitive material.

5. An apparatus as claimed in claim 4, wherein said light emitting element arrays comprise light emitting diode arrays.

6. An apparatus as claimed in claim 4, wherein said light emitting element arrays comprises laser diode arrays.

7. An apparatus as claimed in claim 1, wherein said exposure means comprises:
    a scanning light source
    filter means for applying light in three color wavelengths corresponding to the primary color spectral sensitivities of said photo-sensitive material;
    scanning means for scanning said photo-sensitive material in a direction perpendicular to said conveyance path with a light beam emitted by said scanning light source; and an optical system for focusing said light beam on said photo-sensitive material.

8. An apparatus as claimed in claim 1, wherein said conveyance path is substantially horizontal, and said exposure means and said solvent applying means are movable vertically toward and away from said conveyance path.

9. An apparatus as claimed in claim 1, in which said thermal developing means comprises:
a plate-shaped retaining member provided above said conveyance path; and
a heater member provided below said conveyance path such that said heater member is swingable towards said conveyance path, said heater member receiving said image receiving material on an upper surface thereof from said image receiving material supplying means.

10. An apparatus as claimed in claim 1, wherein said exposure means has a processing speed different from that of said solvent applying means, said apparatus further comprising photo-sensitive material slackening means is provided between said exposure means and said solvent applying means to compensate for processing speed differences.

11. An image recording apparatus comprising:
photo-sensitive material supplying means for conveying a thermal developing photo-sensitive material wound on a supplying roll along a linear conveyance path and winding said photo-sensitive material on a winding roll;
exposure means for giving a linear optical exposure to said photo-sensitive material along a direction perpendicular to said conveyance path in synchronization with conveyance of said photo-sensitive material along said conveyance path;
solvent applying means, provided along said conveyance path, for applying an image forming solvent to said photo-sensitive material after exposure by said exposure mans;
image receiving material supplying means for supplying an image receiving material of a predetermined size to said photo-sensitive material after image forming solvent has been applied by said solvent applying means: and
thermal developing means for combining said photo-sensitive material and said image receiving material and heating said combined image receiving material and said photo-sensitive material, to subject said photo-sensitive material to thermal developing to perform a thermal image transferring operation;
wherein, after said thermal image transferring operation, said photo-sensitive material is wound on said winding roll and said image receiving material thus is separated from said photo-sensitive material.

12. An apparatus as claimed in claim 11, wherein said exposure means comprises:
a linear light source;
filter means for applying light in three color wavelengths corresponding to primary color spectral sensitivities of said thermal developing photo-sensitive material;
a liquid crystal shutter array for controlling the application of light from said linear light source to said photo-sensitive material; and
an optical system for focusing the light from said linear light source on said photo-sensitive material.

13. An apparatus as claimed in claim 12, wherein said filter means comprises three stripe-shaped filters which are selectively applied to said optical system to apply said light in said three color wavelengths.

14. An apparatus as claimed in claim 11, wherein said exposure means comprises:
three light emitting element arrays for applying light in three color wavelengths corresponding to primary color spectral sensitivities of said thermal developing photo-sensitive material; and
an optical system for focusing light from each of said light emitting element arrays on said photo-sensitive material.

15. An apparatus as claimed in claim 14, wherein said light emitting element arrays comprise light emitting diode arrays.

16. An apparatus as claimed in claim 14, wherein said light emitting element arrays comprise laser diode arrays.

17. An apparatus as claimed in claim 11, wherein said exposure means comprises:
a scanning light source;
filter means for applying light in three color wavelengths corresponding to the primary color spectral sensitivities of said photo-sensitive material;
scanning means for scanning said photo-sensitive material in a direction perpendicular to said conveyance path with a light beam emitted by said scanning light source; and
an optical system for focusing said light beam on said photo-sensitive material.

18. An apparatus as claimed in claim 11, wherein said conveyance path is substantially horizontal and said exposure means and said solvent applying means are removable vertically toward and away from said conveyance path.

19. An apparatus as claimed in claim 11, in which said thermal developing means comprises:
a plate-shaped retaining member provided above said conveyance path;
a heater member provided below said conveyance path such that said heater member is movable vertically; and
roller means for successively combining image receiving materials with said photo-sensitive material which are supplied by said image receiving material supplying means.

20. An apparatus as claimed in claim 11, in which said exposure means, said solvent applying means, and, said thermal developing means operate at the same processing speed.

21. An image recording apparatus in which an image recorded on a photo-sensitive material is transferred onto an image receiving material to provide a visible image, said apparatus comprising:
photo-sensitive material supplying means for conveying said photo-sensitive material wound on a supplying roll along a linear conveyance path and winding said photo-sensitive material on a winding roll; and
heating means provided along said conveyance path, for heating said photo-sensitive material and said image receiving material,
said heating means having a heating position and a standby position with respect to said conveyance path so that, when said heating means is held at the heating position said heating means holds and heats said photo-sensitive material and said image receiving material.

22. An apparatus as claimed in claim 21, wherein, when said heating means is held at the standby position, said image receiving material is combined with said photo-sensitive material, and thereafter said heating means is moved to the heating position to hold said photo-sensitive material and said image receiving material so that said photo-sensitive material and said image receiving material are heated while being held.

23. An apparatus as claimed in claim 21, wherein, when said heating means is held at the heating position, said image receiving material is supplied, and said heating means continuously heats said photo-sensitive material and said image receiving material while holding said photo-sensitive material and said image receiving material.

* * * * *